(12) United States Patent
Hollnagel

(10) Patent No.: US 11,427,236 B2
(45) Date of Patent: Aug. 30, 2022

(54) VEHICLE HAVING A DETECTION DEVICE FOR DETECTING A ROUTE-SIDE TRANSMITTER DEVICE AND METHOD FOR OPERATING SAME

(71) Applicant: SIEMENS MOBILITY GMBH, Munich (DE)

(72) Inventor: Gerd Hollnagel, Vordorf (DE)

(73) Assignee: Siemens Mobility GmbH, Munich (DE)

( * ) Notice: Subject to any disclaimer, the term of this patent is extended or adjusted under 35 U.S.C. 154(b) by 479 days.

(21) Appl. No.: 16/499,427

(22) PCT Filed: Mar. 1, 2018

(86) PCT No.: PCT/EP2018/055041
§ 371 (c)(1),
(2) Date: Sep. 30, 2019

(87) PCT Pub. No.: WO2018/177676
PCT Pub. Date: Oct. 4, 2018

(65) Prior Publication Data
US 2020/0039547 A1     Feb. 6, 2020

(30) Foreign Application Priority Data

Mar. 29, 2017   (DE) ..................... 10 2017 205 356.9

(51) Int. Cl.
*B61L 25/02* (2006.01)
*H01Q 1/32* (2006.01)
*H01Q 7/00* (2006.01)
*G01V 3/10* (2006.01)

(52) U.S. Cl.
CPC .............. *B61L 25/026* (2013.01); *G01V 3/10* (2013.01); *H01Q 1/3225* (2013.01); *H01Q 7/00* (2013.01)

(58) Field of Classification Search
None
See application file for complete search history.

(56) References Cited

U.S. PATENT DOCUMENTS

| | | | |
|---|---|---|---|
| 6,781,524 B1 | 8/2004 | Clark et al. | |
| 2010/0141454 A1* | 6/2010 | Banti | G01S 13/4454 340/572.1 |
| 2012/0091210 A1* | 4/2012 | Koujima | H01Q 1/04 235/492 |

(Continued)

FOREIGN PATENT DOCUMENTS

| | | |
|---|---|---|
| DE | 102006033211 A1 | 1/2008 |
| EP | 2388857 A1 | 11/2011 |
| EP | 2905196 A1 | 8/2015 |

(Continued)

*Primary Examiner* — Patrick Assouad
*Assistant Examiner* — Haidong Zhang
(74) *Attorney, Agent, or Firm* — Laurence A. Greenberg; Werner H. Stemer; Ralph E. Locher

(57) ABSTRACT

A vehicle has a detection device for detecting a route-side transmitter device. The detection device has at least two receiving antennas which are suitable for receiving a magnetic field component, oriented in a longitudinal direction of the vehicle, of electromagnetic radiation which is emitted by the route-side transmitter device. The at least two receiving antennas are arranged with an offset in the longitudinal direction of the vehicle.

15 Claims, 3 Drawing Sheets

(56) References Cited

U.S. PATENT DOCUMENTS

2012/0318624 A1 12/2012 Dickson et al.
2015/0025716 A1 1/2015 Orion

FOREIGN PATENT DOCUMENTS

| FR | 2927487 A1 | 8/2009 |
| JP | S57131004 A | 8/1982 |
| WO | WO 2016012106 A1 | 1/2016 |

\* cited by examiner

VEHICLE HAVING A DETECTION DEVICE FOR DETECTING A ROUTE-SIDE TRANSMITTER DEVICE AND METHOD FOR OPERATING SAME

BACKGROUND OF THE INVENTION

Field of the Invention

The invention relates to a vehicle with a detection device for detecting a route-side transmitter device.

The so-called Eurobalise is known in the field of locating rail vehicles. The Eurobalise involves a passive balise which, when a rail vehicle approaches, is brought into operation using energy transferred by electromagnetic means and subsequently sends a position signal at a frequency of 4 MHz, which enables the locating of a passing rail vehicle. Specifically, the position signal contains a coding which identifies the balise, so that the vehicle, which knows the positions of balises installed in the route network, is able to determine its own position.

SUMMARY OF THE INVENTION

The invention is based on the object of disclosing a vehicle with a detection device, which is less sensitive to interfering incoming radiation, in particular to crosstalk due to external radiation, than that of previously known vehicles.

This object is achieved according to the invention by a vehicle having the features as claimed. Advantageous embodiments of the vehicle according to the invention are disclosed in dependent claims.

Accordingly, provision is made according to the invention for the detection device to have at least two receiving antennas, which are suitable for receiving a magnetic field component of electromagnetic radiation oriented in the vehicle longitudinal direction, which is sent by a route-side transmitter device, and for the at least two receiving antennas to be arranged offset in the vehicle longitudinal direction.

A significant advantage of the vehicle according to the invention is to be seen in that the detection device thereof is able to correctly detect route-side transmitter devices, such as balises for example, in a particularly reliable manner when they are traveled over in the vehicle longitudinal direction. Unlike detection devices in previously known vehicles, in the vehicle according to the invention or in the detection device of the vehicle according to the invention, specifically the magnetic field component oriented in the vehicle longitudinal direction is received, so that—as has been established on the part of the inventor—any interference to the receiving operation due to external radiation occurs to a considerably lesser extent, if at all, than in detection devices as are conventional today, which measure the magnetic field component oriented in the vertical direction or in the vehicle Z direction.

The vehicle preferably involves a rail vehicle and the route-side transmitter device a route-side balise.

Each of the at least two receiving antennas preferably comprises at least one conductor loop in each case, the surface normal of which is oriented in the vehicle longitudinal direction.

It is particularly advantageous if each of the at least two receiving antennas comprises at least one conductor coil in each case, the surface normal of which is oriented in the vehicle longitudinal direction.

The spacing between a first receiving antenna of the at least two receiving antennas of the detection device and a second receiving antenna of the at least two receiving antennas of the detection device is preferably dimensioned such that, when the transmitter device is traveled over, the phase of the measured value of the first receiving antenna switches its sign if the amount of the measured value of the second receiving antenna is at a maximum, and the phase of the measured value of the second receiving antenna switches its sign if the amount of the measured value of the first receiving antenna is at a maximum.

The spacing between a first receiving antenna of the at least two receiving antennas of the detection device and a second receiving antenna of the at least two receiving antennas of the detection device preferably lies between 10 and 30 cm, particularly if the detection device is to be used for detecting Eurobalises. In Eurobalises, the spacing between transverse conductors, which generate magnetic field components in the vehicle longitudinal direction, conventionally lies in the range of approx. 20 cm, so that a receiving antenna spacing of between 10 and 30 is particularly suitable.

It is considered particularly advantageous if the detection device is embodied for detecting electromagnetic radiation of a route-side transmitter device, which comprises at least one route-side conductor loop, the surface normal of which is oriented vertically, wherein a first transverse conductor of said route-side conductor loop is arranged perpendicular to the route longitudinal direction and a second transverse conductor arranged with a predetermined transverse conductor spacing in relation thereto is likewise arranged perpendicular to the route longitudinal direction, and wherein the spacing between a first receiving antenna of the detection device and a second receiving antenna of the detection device is as large as the transverse conductor spacing or lies in a range of ±50% of the transverse conductor spacing.

Moreover, further receiving antennas, i.e. a third receiving antenna for example, may be arranged in the middle between the first and second receiving antennas.

The three or more receiving antennas are preferably arranged equidistantly.

Moreover, the invention relates to an arrangement with at least one vehicle and at least one route-side transmitter device. According to the invention, in relation to such an arrangement, provision is made for the at least one vehicle to be a vehicle, such as has been described above.

With regard to the advantages of said arrangement, reference is made to the above embodiments in conjunction with the vehicle according to the invention.

In such an arrangement, it is advantageous if the spacing between a first and a second receiving antenna of the detection device, in particular the spacing between the frontmost receiving antenna seen in the vehicle longitudinal direction and the rearmost receiving antenna seen in the vehicle longitudinal direction in the case of more than two receiving antennas, is dimensioned such that, when the transmitter device is traveled over, the phase of the measured value of the first, in particular frontmost receiving antenna switches its sign if the amount of the measured value of the second, in particular rearmost receiving antenna is at a maximum—preferably for the first time—and the phase of the measured value of the second, in particular the rearmost receiving antenna switches its sign if the amount of the measured value of the first, in particular frontmost receiving antenna is at a maximum—preferably once again.

It is also advantageous in such an arrangement if the route-side transmitter device comprises at least one route-side conductor loop, the surface normal of which is oriented vertically, a first transverse conductor of the route-side conductor loop is arranged perpendicular to the route longitudinal direction and a second transverse conductor arranged with a predetermined transverse conductor spacing in relation thereto is likewise arranged perpendicular to the route longitudinal direction, and the spacing between the receiving antennas of the detection device in the case of two receiving antennas or the spacing between the frontmost receiving antenna seen in the vehicle longitudinal direction and the rearmost receiving antenna seen in the vehicle longitudinal direction, in the case of more than two receiving antennas, is as large as the transverse conductor spacing or lies in a range of ±50% of the transverse conductor spacing.

The invention also relates to a detection device, in particular for a vehicle or an arrangement as have been described above, for detecting a route-side transmitter device. According to the invention, provision is made in relation to such a detection device for said device to have at least two receiving antennas, which are suitable for receiving a magnetic field component of electromagnetic radiation which is sent by the route-side transmitter device, and for the at least two receiving antennas to be arranged offset.

It is considered to be advantageous for the detection device if said device is able to be mounted onto a vehicle in such a manner that the at least two receiving antennas are suitable for receiving a magnetic field component of the electromagnetic radiation oriented in the vehicle longitudinal direction and the at least two receiving antennas are arranged offset in the vehicle longitudinal direction.

Moreover, the invention relates to a method for operating an arrangement, which comprises at least one vehicle and at least one route-side transmitter device. According to the invention, provision is made in relation to such a method for a magnetic field component, oriented in the route longitudinal direction, of electromagnetic radiation which is sent by a route-side transmitter device, to be received using at least two receiving antennas which are arranged offset in the route longitudinal direction.

With regard to the advantages of said method, reference is made to the above embodiments in conjunction with the vehicle according to the invention.

It is considered particularly advantageous if the spacing between a first and a second receiving antenna of the detection device, in particular the spacing between the frontmost receiving antenna seen in the vehicle longitudinal direction and the rearmost receiving antenna seen in the vehicle longitudinal direction in the case of more than two receiving antennas, is dimensioned such that, when the transmitter device is traveled over, the phase of the measured value of the first, in particular frontmost receiving antenna switches its sign if the amount of the measured value of the second, in particular rearmost receiving antenna is at a maximum—preferably for the first time—and the phase of the measured value of the second, in particular the rearmost receiving antenna switches its sign if the amount of the measured value of the first, in particular frontmost receiving antenna is at a maximum—preferably once again—and the detection device evaluates the measured values of the receiving antennas.

BRIEF DESCRIPTION OF THE SEVERAL VIEWS OF THE DRAWING

The invention is explained in more detail below on the basis of exemplary embodiments, in which, by way of example.

DESCRIPTION OF THE INVENTION

Figure 1:
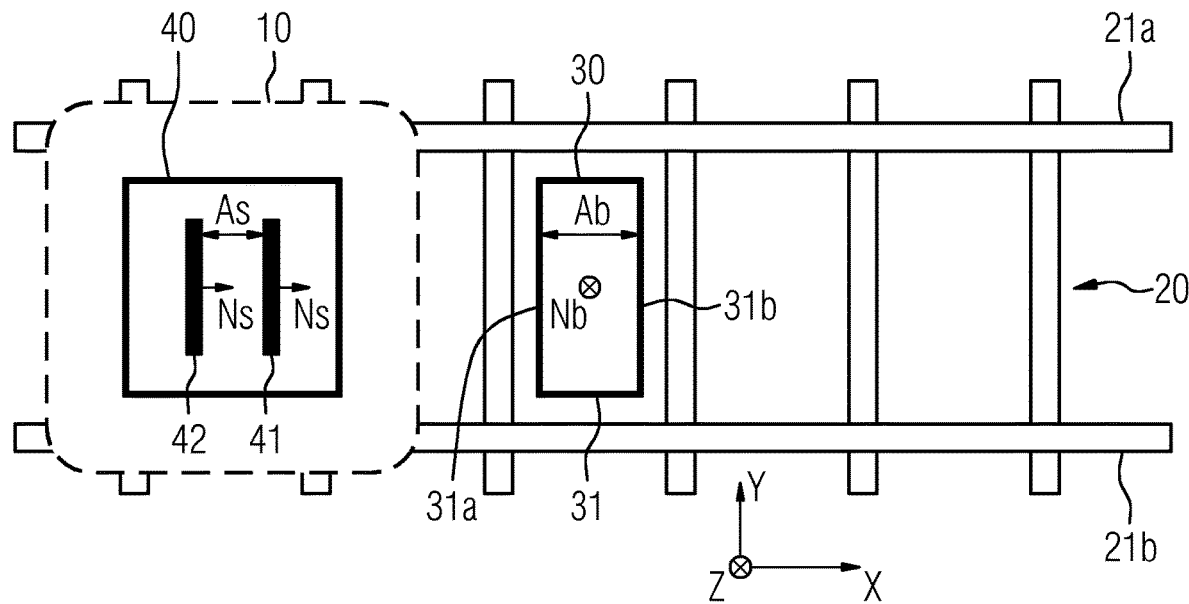
FIG. 1 shows an arrangement with a rail vehicle, which travels on a track equipped with a route-side transmitter device, in a top view.
Figure 2:
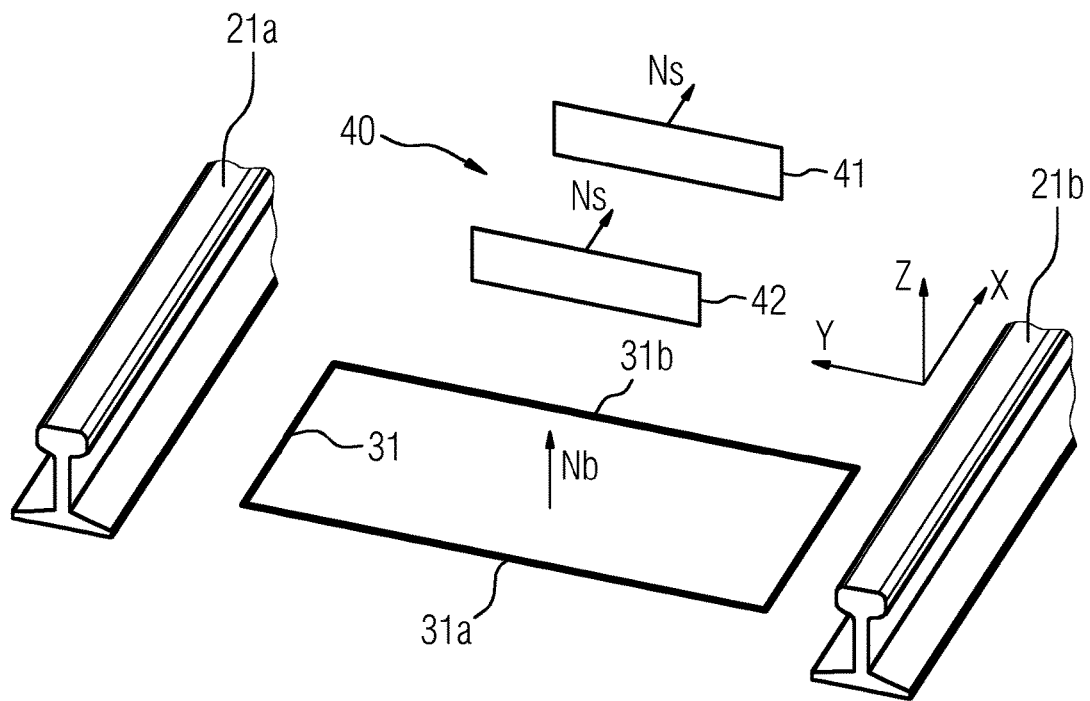
FIG. 2 shows the arrangement in accordance with FIG. 1 in a schematic three-dimensional representation, obliquely from the side.

For the sake of clarity, in the drawings, the same reference characters are always used for identical or similar components.

FIG. 1 shows a rail vehicle 10, which travels on a track 20. The track 20 comprises two rails 21a and 21b arranged in parallel.

The track 20 is additionally equipped with a route-side transmitter device 30, which may involve a transponder, in particular in the form of a balise, as is known in the field of rail engineering as a Eurobalise for example. The route-side transmitter device 30 has a first transverse conductor 31a, on the left in FIG. 1, and also a second transverse conductor 31b, on the right in FIG. 1. The two transverse conductors 31a and 31b extend in the Y direction, i.e. perpendicular to the longitudinal direction X of the track 20 and thus perpendicular to the longitudinal direction X of the rail vehicle 10. The spacing between the two transverse conductors 31a and 31b is identified by the reference character Ab in FIG. 1.

The two transverse conductors 31a and 31b form constituent parts of a conductor loop 31 or a conductor coil comprising a plurality of conductor loops 31, the surface normal of which is identified by the reference character Nb in FIG. 1. The surface normal Nb extends out from the image plane along the Z direction.

If the rail vehicle 10 travels from left to right in the representation in accordance with FIG. 1, then it will pass the route-side transmitter device 30. In order to be able to detect the route-side transmitter device 30, the rail vehicle 10 is equipped with a detection device 40.

The detection device 40 has a first receiving antenna 41, which is at the front when traveling in the direction toward the route-side transmitter device 30, and also a second receiving antenna 42, which is at the rear when traveling in the direction toward the route-side transmitter device 30. The spacing between the two receiving antennas 41 and 42 is identified by the reference character as in FIG. 1.

The two receiving antennas 41 and 42 each comprise a conductor loop or a conductor coil formed by a plurality of conductor loops, the surface normal of which is identified by the reference character Ns in FIG. 1. The surface normal is oriented in the vehicle longitudinal direction X and thus stands perpendicular to the surface normal Nb of the route-side conductor loop 31.

Figure 4:
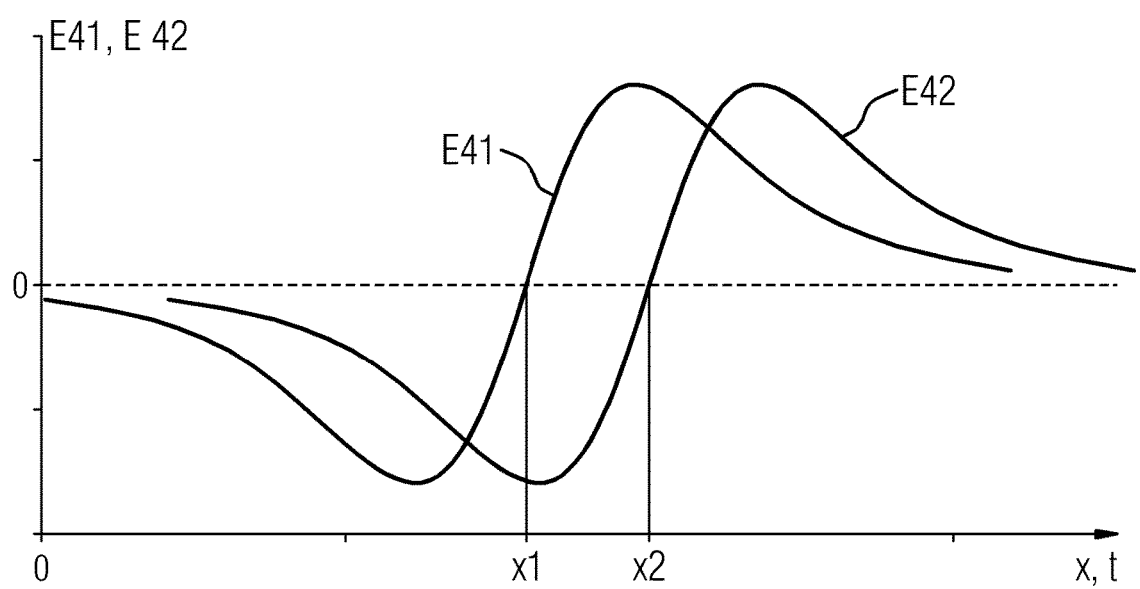
FIG. 4 shows the receive power recorded by the receiving antennas of the rail vehicle in accordance with FIG. 1—in relation to the magnetic field component, oriented in the vehicle longitudinal direction, of the radiation sent by the route-side transmitter device—as a function of the respective location of the rail vehicle on the track.

If, starting from the representation in accordance with FIG. 1, the rail vehicle 10 travels toward the route-side transmitter device 30 and beyond it, then initially the first or front receiving antenna 41 of the detection device 40 will enter the region of the magnetic field generated by the first transverse conductor 31a of the conductor loop 31 and generate a corresponding receiving signal E41 (see FIG. 4). Subsequently, the first receiving antenna 41 will enter the region of the second transverse conductor 31b and detect the magnetic field thereof.

The same applies for the second or rear receiving antenna 42, which will generate a corresponding receiving signal E42 (see FIG. 4) with a location or time offset.

Figure 3:
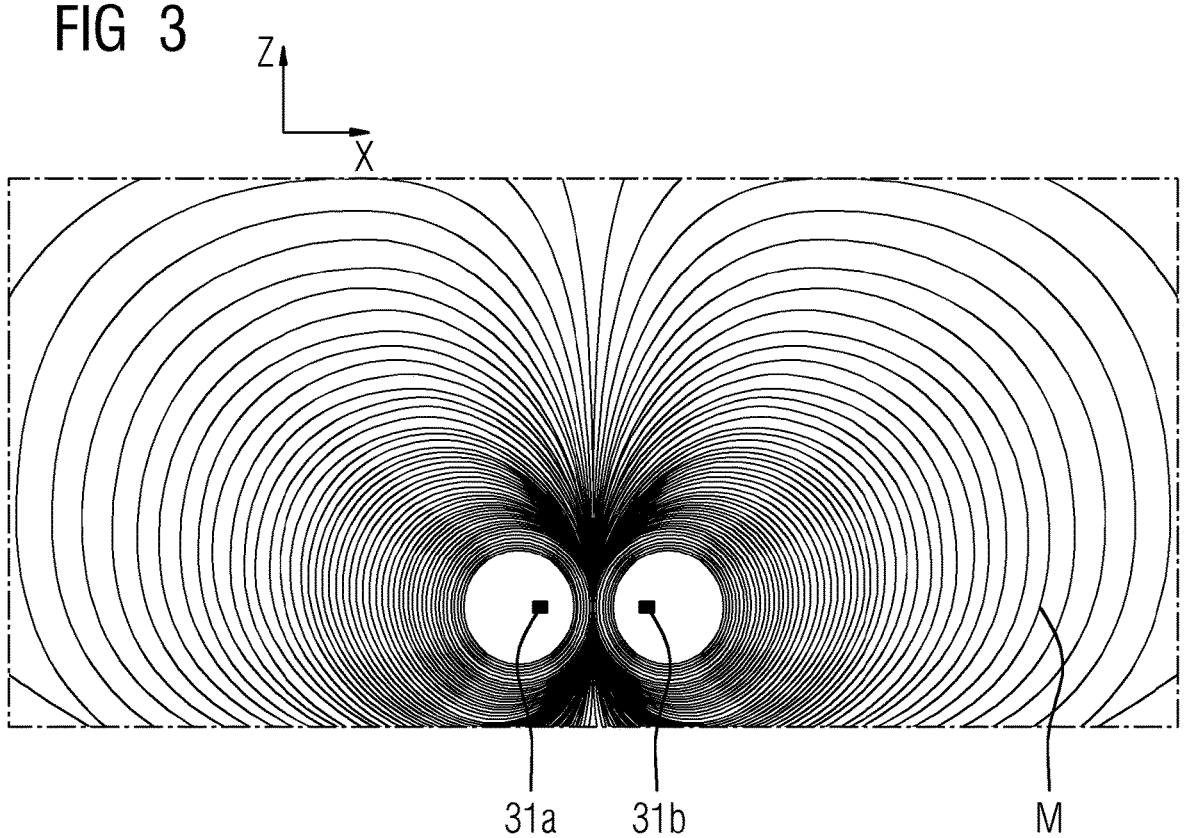
FIG. 3 shows, in a two-dimensional step, the magnetic field generated by the route-side transmitter device in accordance with FIG. 1.

FIG. 3 shows a cross-section of the magnetic field M generated by the route-side transmitter device 30 in the XZ plane. It is possible to detect that the magnetic field component oriented in the vehicle longitudinal direction X or in the route longitudinal direction X is particularly pronounced in the region of the two transverse conductors 31a and 31b and thus has a particularly large amplitude.

In the region between the two transverse conductors 31a and 31b, the magnetic field component oriented in the vehicle longitudinal direction X is relatively small; the magnetic field component of the magnetic field M oriented in the Z direction dominates in this region.

FIG. 4 shows, over the route longitudinal direction X and thus when the transmitter device 30 is traveled over, the temporal progression of the receive power E41 and E42 of the two receiving antennas 41 and 42 over time t. Since the surface normals Nb of the receiving antennas 41 and 42 are oriented in the vehicle longitudinal direction X, the receiving antennas 41 and 42 are sensitive to and measure the magnetic field component Mx oriented in the vehicle longitudinal direction X.

It can be seen in FIG. 4 that the receive powers E41 and E42 of the two receiving antennas 41 and 42 are shifted in phase, since initially the first receiving antenna 41 will enter the region of the route-side transmitter device 30 and only after will the second receiving antenna 42. The spatial position or the respective location of the rail vehicle 10 at the occurrence of the zero crossing and phase switch of the receive powers E41 and E42 is identified in the Figure by the reference character x1 and x2, respectively.

With a view toward an optimal evaluation of the receive powers, it is considered to be advantageous if the spacing Ab between the two receiving antennas 41 and 42 is dimensioned such that, when the route-side transmitter device 30 is traveled over, the phase of the receive power 41 of the first receiving antenna 41 switches its sign (see location X1 in FIG. 4), if the amount of the receive power E42 of the second receiving antenna 42 is at a maximum for the first time (during the respective traveling-over of the conductor loop 31 in the X direction), and the phase of the receive power E42 of the second receiving antenna 42 switches its sign (see location X2 in FIG. 4), if the amount of the receive power E41 of the first receiving antenna 41 is at a maximum for the second time (during the same traveling-over process of the conductor loop 31).

A receiving behavior of this kind is able to be achieved if the spacing as between the two receiving antennas 41 and 42 is precisely as large or at least approximately as large as the spacing Ab between the transverse conductors 31 and 31b of the conductor loop 31 of the route-side transmitter device 30.

Figure 5:
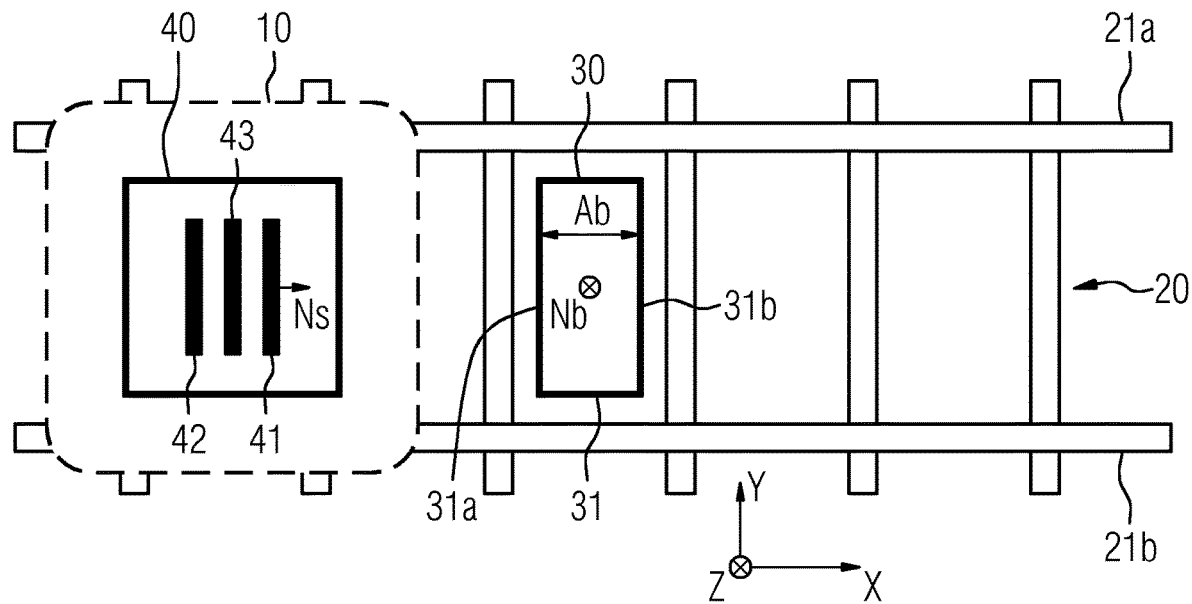
FIG. 5 shows an exemplary embodiment for an arrangement, in which a receiver device of the rail vehicle is equipped with three receiving antennas.

FIG. 5 shows by way of example an arrangement, in which a rail vehicle 10 traveling on a track 20 has a detection device 40 with three receiving antennas 41, 42 and 43. The third receiving antenna 43 is preferably arranged in the middle between the first and second receiving antennas 41 and 42.

Figure 6:
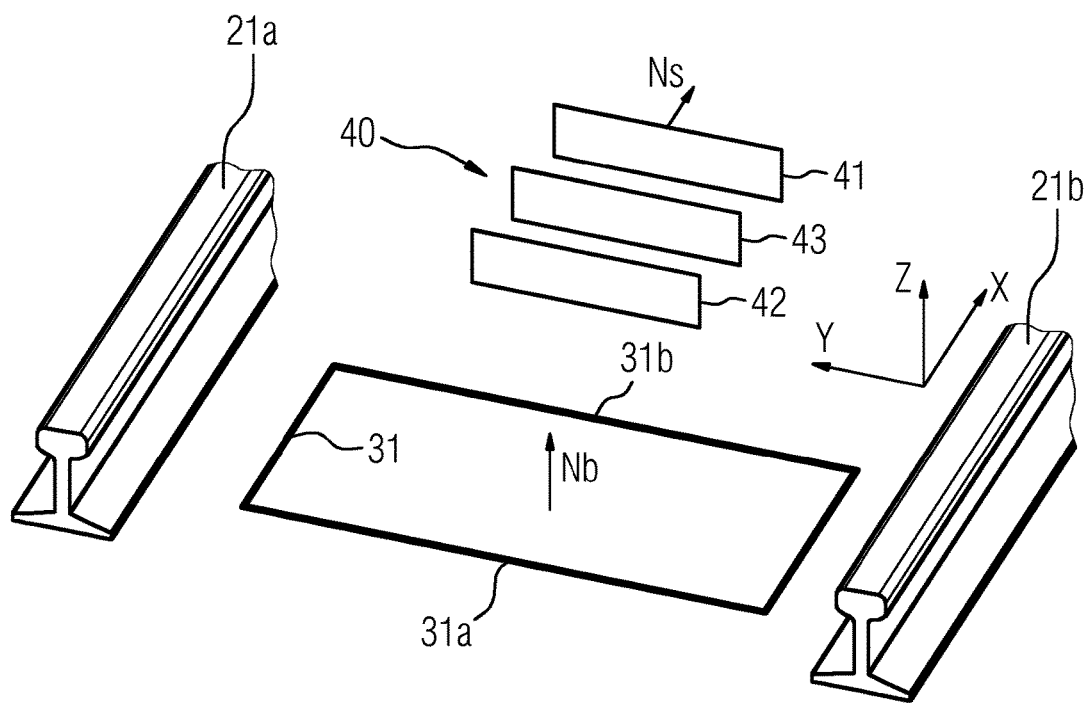
FIG. 6 shows the arrangement in accordance with FIG. 5 in a simplified three-dimensional representation, obliquely from the side.

FIG. 6 shows the detection device 40 with the three receiving antennas 41, 42 and 43 once more in a three-dimensional representation, obliquely from the side.

If the rail vehicle 10 shown in FIG. 5 travels into the region of the route-side transmitter device 30, then the receive power or the measured value of the third receiving antenna 43 will correspond to the progression of the receive powers of the two receiving antennas 41 and 42 (see FIG. 4) and lie in the middle between these two progressions.

Although the invention has been illustrated and described in detail based on preferred exemplary embodiments, the invention is not restricted by the examples given and other variations can be derived therefrom by a person skilled in the art without departing from the protective scope of the invention.

The invention claimed is:

1. A vehicle, comprising:
a detection device for detecting a route-side transmitter device, said detection device having at least two receiving antennas that are configured for receiving a magnetic field component of electromagnetic radiation oriented in a vehicle longitudinal direction, wherein the electro-magnetic radiation is emitted by the route-side transmitter device;
said detection device being configured for detecting electromagnetic radiation of a route-side transmitter device that comprises at least one route-side conductor loop having a vertically oriented surface normal;
said route-side conductor loop having a first transverse conductor extending perpendicular to a route longitudinal direction and a second transverse conductor arranged with a predetermined transverse conductor spacing from said first transverse conductor and extending perpendicular to the route longitudinal direction;
said at least two receiving antennas being disposed with an offset in the vehicle longitudinal direction, and said at least two receiving antennas including a first receiving antenna and a second receiving antenna disposed at a spacing distance from said first receiving antenna, with a spacing between said first and second receiving antennas being as large as the transverse conductor spacing or zing within a range of ±50% of the transverse conductor spacing.

2. The vehicle according to claim 1, wherein the vehicle is a rail vehicle and the route-side transmitter device is a track-side balise.

3. The vehicle according to claim 1, wherein each of said at least two receiving antennas comprises at least one conductor loop defining a surface normal oriented in the vehicle longitudinal direction.

4. The vehicle according to claim 1, wherein each of said at least two receiving antennas comprises at least one conductor coil defining a surface normal oriented in the vehicle longitudinal direction.

5. The vehicle according to claim 1, wherein said at least two receiving antennas of said detection device include a first receiving antenna and a second receiving antenna disposed at a spacing distance from said first receiving antenna, said spacing distance between said first and second receiving antenna antennas is dimensioned such that, when the transmitter device is traveled over by the vehicle, a phase of a measured value of said first receiving antenna switches a sign thereof when a magnitude of a measured value of said second receiving antenna is at a maximum, and a phase of the measured value of said second receiving antenna switches a sign thereof when a magnitude of the measured value of said first receiving antenna is at a maximum.

6. The vehicle according to claim 1, wherein said at least two receiving antennas of said detection device include a first receiving antenna and a second receiving antenna, and wherein a spacing distance between said first receiving antenna and said second receiving antenna lies between 10 and 30 cm.

7. The vehicle according to claim 1, further comprising a third receiving antenna arranged centrally between said first and second receiving antennas.

8. The vehicle according to claim 1, wherein said detection device comprises at least three receiving antennas.

9. The vehicle according to claim 8, wherein said at least three receiving antennas are equidistantly spaced from one another.

10. An arrangement, comprising:
at least one route-side transmitter device comprising at least one route-side conductor loop having a vertically oriented surface normal;
said route-side conductor loop having a first transverse conductor extending perpendicular to the route longitudinal direction and a second transverse conductor arranged with a predetermined transverse conductor spacing relative to said first transverse conductor and also extending perpendicular to the route longitudinal direction;
a spacing between said first and second receiving antennas of said detection device in the vehicle longitudinal direction is as great as the transverse conductor spacing or lies in a range of ±50% of the transverse conductor spacing; and
at least one vehicle having a detection device for detecting said route-side transmitter device, said detection device having at least two receiving antennas that are configured for receiving a magnetic field component of electromagnetic radiation oriented in a vehicle longitudinal direction, wherein the electro-magnetic radiation is emitted by said route-side transmitter device;
said at least two receiving antennas being disposed with an offset in the vehicle longitudinal direction.

11. The arrangement according to claim 10, wherein said at least two receiving antennas of said detection device include a first receiving antenna and a second receiving antenna disposed at a spacing distance from said first receiving antenna, the spacing distance between said first and second receiving antennas is dimensioned such that, when said transmitter device is traveled over, a phase of a measured value of said first receiving antenna switches a sign when a magnitude of a measured value of said second receiving antenna is at a maximum, and a phase of the measured value of said second receiving antenna switches a sign when a magnitude of the measured value of the first receiving antenna is at a maximum.

12. The arrangement according to claim 10, wherein:
said detection device comprises at least three receiving antennas including a frontmost receiving antenna and a rearmost receiving antenna disposed at a spacing distance from one another in the vehicle longitudinal direction; and
a phase of a measured value of said frontmost receiving antenna switches a sign when a magnitude of a measured value of said rearmost receiving antenna lies at a maximum, and a phase of the measured value of said rearmost receiving antenna switches a sign when the magnitude of the measured value of said frontmost receiving antenna lies at a maximum.

13. The arrangement according to claim 12, wherein:
said route-side transmitter device comprises at least one route-side conductor loop having a vertically oriented surface normal;
said route-side conductor loop having a first transverse conductor extending perpendicular to the route longitudinal direction and a second transverse conductor arranged with a predetermined transverse conductor spacing relative to said first transverse conductor and also extending perpendicular to the route longitudinal direction; and
a spacing between said frontmost receiving antenna of said detection device and said rearmost receiving antenna in the vehicle longitudinal direction is as great as the transverse conductor spacing or lies in a range of ±50% of the transverse conductor spacing.

14. A method for operating an arrangement that includes at least one vehicle and at least one route-side transmitter device, the method comprising:
providing at least two antennas with an offset relative to one another in a route longitudinal direction; and
receiving with the at least two antennas a magnetic field component, oriented in the route longitudinal direction, of electromagnetic radiation emitted by a route-side transmitter device;
dimensioning a spacing between a first receiving antenna and a second receiving antenna of the detection device in a vehicle longitudinal direction such that, when the transmitter device is traveled over, a phase of a measured value of the first receiving antenna switches a sign when a magnitude of a measured value of the second receiving antenna is at a maximum, and a phase of the measured value of the second receiving antenna switches a sign when a magnitude of the measured value of the first receiving antenna lies at a maximum; and
evaluating the measured values of the first and second receiving antennas with the detection device.

15. The method according to claim 14, wherein:
providing the detection device with at least three receiving antennas including a frontmost receiving antenna and a rearmost receiving antenna in a vehicle longitudinal direction;
dimensioning a spacing between the frontmost receiving antenna and the rearmost receiving antenna in the vehicle longitudinal direction such that, when the transmitter device is traveled over, a phase of a measured value of the frontmost receiving antenna switches a sign when a magnitude of a measured value of the rearmost receiving antenna lies at a maximum, and a phase of the measured value of the rearmost receiving antenna switches a sign when a magnitude of the measured value of the frontmost receiving antenna lies at a maximum; and
evaluating the measured valued of the frontmost and rearmost receiving antennas with the detection device.

* * * * *